United States Patent
Huang et al.

(10) Patent No.: US 10,802,606 B2
(45) Date of Patent: Oct. 13, 2020

(54) METHOD AND DEVICE FOR ALIGNING COORDINATE OF CONTROLLER OR HEADSET WITH COORDINATE OF BINOCULAR SYSTEM

(71) Applicant: GUANGDONG VIRTUAL REALITY TECHNOLOGY CO., LTD., Guangzhou, Guangdong Province (CN)

(72) Inventors: Sibin Huang, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou, Guangdong Province (CN)

(*) Notice: Subject to any disclaimer, the term of this patent is extended or adjusted under 35 U.S.C. 154(b) by 58 days.

(21) Appl. No.: 16/236,488

(22) Filed: Dec. 29, 2018

(65) Prior Publication Data

US 2019/0138114 A1 May 9, 2019

Related U.S. Application Data

(63) Continuation of application No. PCT/CN2017/096120, filed on Aug. 4, 2017.

(30) Foreign Application Priority Data

Apr. 25, 2017 (CN) .......................... 2017 1 0278094

(51) Int. Cl.
*G06F 3/03* (2006.01)
*G06F 3/0346* (2013.01)
(Continued)

(52) U.S. Cl.
CPC .............. *G06F 3/0304* (2013.01); *G06F 3/01* (2013.01); *G06F 3/012* (2013.01); *G06F 3/0346* (2013.01);
(Continued)

(58) Field of Classification Search
CPC . G06T 7/593; G06T 7/70; G06T 2207/10012; G06T 2207/10021
(Continued)

(56) References Cited

U.S. PATENT DOCUMENTS

2010/0013812 A1* 1/2010 Gu ..................... G06F 3/0346
345/207
2014/0168367 A1 6/2014 Kang
(Continued)

FOREIGN PATENT DOCUMENTS

CN 105898275 A 8/2016
CN 106095102 A 11/2016
(Continued)

*Primary Examiner* — Mark Edwards
(74) *Attorney, Agent, or Firm* — Cheng-Ju Chiang (57) ABSTRACT

The present disclosure provides a method and a device for aligning a coordinate of a controller or a headset with a coordinate of a binocular system. The method includes: obtaining pose data of the controller; acquiring real-time coordinate data in a binocular coordinate system during a repeating movement of the controller based on a light spot emitted from the controller; generating a motion track of the controller during the movement based on the real-time coordinate data and the pose data; obtaining a pose of the controller in controller coordinate system based on the motion track; obtaining a first angle between the positive direction of the controller coordinate system and a positive direction of the binocular coordinate system; and correcting the binocular coordinate system based on the first angle until the angle reaches zero. The method and device for aligning coordinates is easy to be implemented with low cost.

20 Claims, 4 Drawing Sheets (51) Int. Cl.
  *G06T 7/70*   (2017.01)
  *G06F 3/01*   (2006.01)
  *G06T 7/593*  (2017.01)

(52) U.S. Cl.
  CPC ............... *G06T 7/593* (2017.01); *G06T 7/70* (2017.01); *G06T 2207/10012* (2013.01); *G06T 2207/10021* (2013.01)

(58) Field of Classification Search
  USPC ........................................................ 345/156
  See application file for complete search history.

(56) References Cited

U.S. PATENT DOCUMENTS

2017/0024935 A1     1/2017  Baba
2017/0358139 A1 *  12/2017  Balan ..................... G06F 3/011

FOREIGN PATENT DOCUMENTS

| CN | 106249918 A   | 12/2016 | |
| CN | 106371566 A   | 2/2017  | |
| CN | 106454291 A   | 2/2017  | |
| GB |   2351636 A * | 1/2001  | ............. G06F 3/011 |
| WO | 2018/196216 A1 | 11/2018 | |

\* cited by examiner

METHOD AND DEVICE FOR ALIGNING COORDINATE OF CONTROLLER OR HEADSET WITH COORDINATE OF BINOCULAR SYSTEM

CROSS-REFERENCE TO RELATED APPLICATION

This Application is a continuation of International Application No. PCT/CN2017/096120, entitled "METHOD AND SYSTEM FOR ALIGNING COORDINATES, AND A VIRTUAL REALITY SYSTEM" filed Aug. 4, 2017, which claims benefit of Chinese patent application No. 201710278094.2 filed on Apr. 25, 2017, which is incorporated by reference herein in its entirety for all purposes.

TECHNICAL FIELD

The disclosure relates to the field of virtual reality, mixed reality, and/or augmented reality, and more particularly to a method and device for aligning coordinate of controller or headset with coordinate of binocular system.

BACKGROUND

With the development of virtual reality (VR), augmented reality (AR) and mixed reality (MR), it is not only necessary to improve the content for watching, but also to establish communicate between the virtual environment and the real world via various optical elements, sensors, and the like. Thus, the virtual environment can be operated and controlled by real devices in the real world.

VR is taken as an example herein. An existing VR interactive device may include a head mounted display (or a headset), an internal or external tracking transmitter or receiver (such as a stereo camera, an infrared receiver or emitter, or a signal emitting receiver) and a hand-hold controller. The cooperation among the headset, the tracking transmitter or receiver and the controller can be used for capturing motion of the user.

The method mainly applies Inside-Out (hereinafter referred to as IO) and Outside-In (hereinafter referred to as OI) to capture actions. For example, IO includes pose recognition applied by Leap Motion, Xhawk by Ximmerse, and the like. OI is provided with Occulus Constellation, HTC VIVIE, Sony PSVR, and the like.

In the above scheme, the coordinate of an IMU (Inertial Measurement Unit, which is used for measuring the three-axis pose angle or angular rate of an object, wherein the IMU module includes a gyroscope, an accelerometer and a magnetometer) in the controller needs to be aligned with the optical coordinate (the coordinate of device used for tracking and positioning the controller). At present, multi-light spot target pose estimation is often adopted to directly estimate a pose of an object through optical tracking in alignment scheme. Since multiple light spots are adopted, it is necessary to arrange a plurality of light transmitters or receivers on headset. The light spots must be deployed in all directions according to the existing scheme, therefore the complexity is very high. The installation of the light transmitter or receivers requires high precision and quite complex calibration, the cost is quite high and difficult to be mass-produced, the product is complex in configuration, it will take one or two hours to assemble the product successfully by a professional skilled person.

SUMMARY

The present disclosure provides a method for aligning a coordinate of a controller or a headset with a coordinate of a binocular system to align a positive direction of the controller or the headset with a positive direction of a virtual environment coordinate system.

According to one aspect of the disclosure, a method for aligning a coordinate of a controller with a coordinate of a binocular system includes: obtaining pose data of the controller; acquiring real-time coordinate data of the controller in a binocular coordinate system during a repeating movement based on a light spot emitted from the controller; generating a motion track of the controller during the repeating movement based on the real-time coordinate data and the pose data corresponding to the real-time coordinate data; determining a pose of the controller in a controller coordinate system based on the motion track, and the pose being defined as a positive direction of the controller in the binocular coordinate system; determining an angle between the positive direction of the controller coordinate system and a positive direction of the binocular coordinate system, the angle being defined as a first angle; and correcting the binocular coordinate system based on the first angle until the angle between the positive direction of the controller and the positive direction of the binocular coordinate system reaches zero.

According to another aspect of the disclosure, a method for aligning a coordinate of a headset with a coordinate of a binocular system includes: estimating a position and orientation of the headset in the binocular coordinate system based on two light spots emitted from the headset, wherein the orientation of the headset in the binocular coordinate system is defined as a headset direction vector; calculating an angle between the headset direction vector and a preset binocular direction vector in the binocular coordinate system, the angle is defined as a second angle; adjusting an angle between a positive direction of an object corresponding to the headset in the virtual environment and the positive direction of the virtual environment coordinate system of the virtual environment based on the second angle; and adjusting the position of the object corresponding to the headset in the virtual environment in the binocular coordinate system based on the position of the headset in the binocular coordinate system.

According to another aspect of the disclosure, a device for aligning a coordinate of a controller with a coordinate of a binocular system includes one or more processors; and memory storing one or more programs configured to be executed by the one or more processors, the one or more programs comprising instructions for: obtaining pose data of the controller; acquiring real-time coordinate data of the controller in a binocular coordinate system during a repeating movement based on a light spot emitted from the controller; generating a motion track of the controller during the repeating movement based on the real-time coordinate data and the pose data corresponding to the real-time coordinate data; determining a pose of the controller in a controller coordinate system based on the motion track, and the pose being defined as a positive direction of the controller in the binocular coordinate system; determining an angle between the positive direction of the controller coordinate system and a positive direction of the binocular coordinate system, the angle being defined as a first angle; and correcting the binocular coordinate system based on the first angle until the angle between the positive direction of the controller and the positive direction of the binocular coordinate system reaches zero.

Based on the above embodiment, when the IMU is aligned to the controller, only one light spot is needed to be arranged on the controller. The alignment between the positive direction of the controller (or the headset) and the positive direction of the virtual environment coordinate system is realized. The implementation process is simple, and the cost is low.

BRIEF DESCRIPTION OF THE DRAWINGS

To describe the technical solutions in the embodiments of the present disclosure more clearly, the following briefly introduces the accompanying drawings required for describing the embodiments of the present disclosure or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
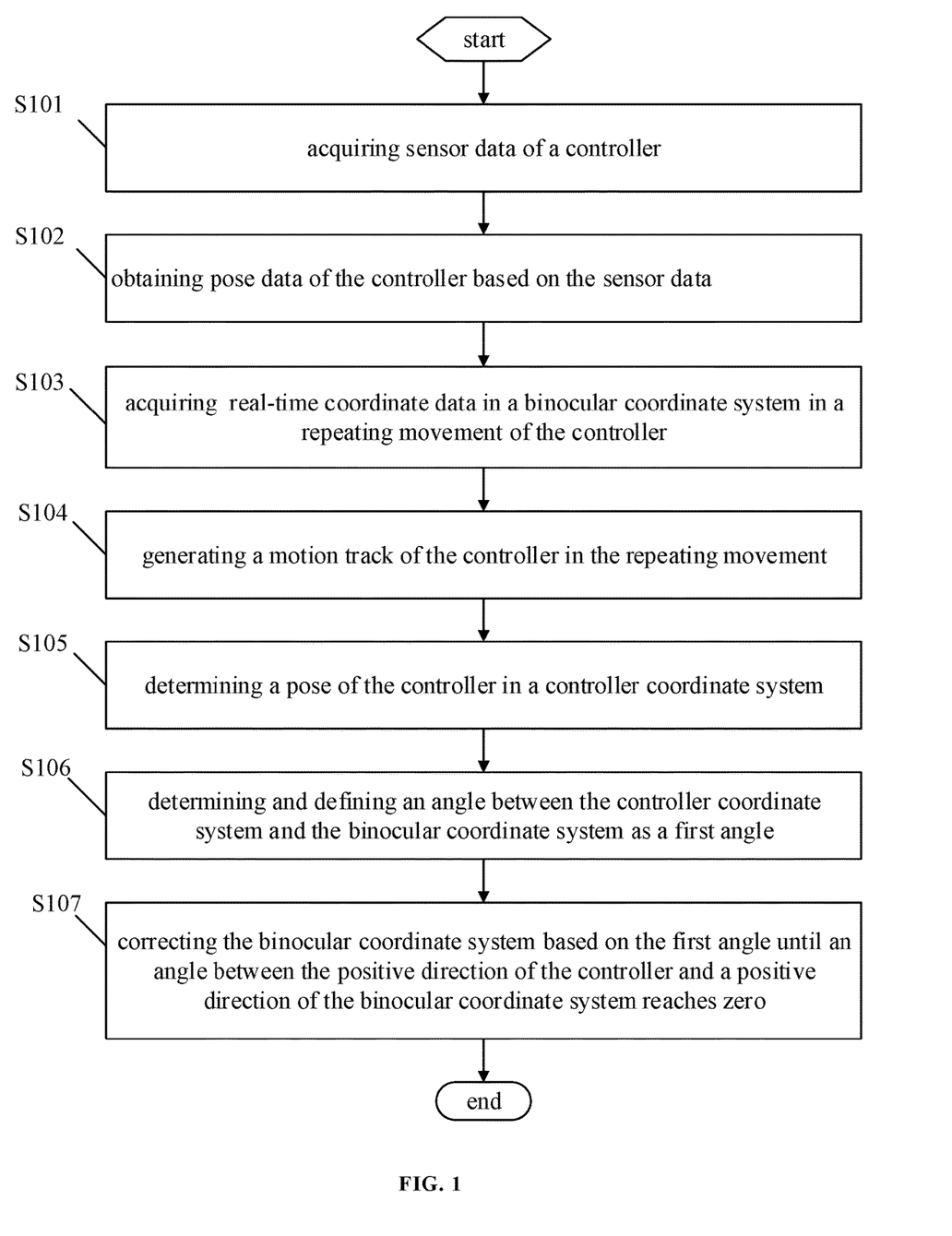
FIG. 1 is a flowchart of an embodiment of a method for aligning a coordinate of a controller with a coordinate of a binocular system according to the present disclosure.

The present disclosure discloses a method for aligning a coordinate of a controller with a coordinate of a binocular system, which may be applied on a VR device, an AR device, or an MR device. FIG. 1 illustrates a flowchart of a method for aligning the coordinate of the controller with the coordinate of the binocular system. The method includes the following blocks.

At block S101, sensor data of the controller can be acquired.

The controller may be a remote-controller, such as a hand-hold controller of virtual reality device, augmented reality device or mixed reality device. A plurality of controllers can be arranged in a set of devices. In general, it is common that two controllers are provided in a set of devices. An IMU (Inertial Measurement Unit) is arranged inside the controller. The IMU includes a plurality of sensors, which are used for measuring a pose of the controller. The sensor data obtained by the sensors may be fused to obtain a pose data O1 (yaw, pitch and roll), and O2 (yaw, pitch, roll) of the two controllers, respectively.

At block S102, pose data is obtained based on the sensor data.

At block S103, real-time coordinate data of the controller in the binocular coordinate system during a repeating movement can be acquired based on a light spot emitted from the controller, while the pose data of the controller is obtained.

A light spot emitting unit arranged on each controller is used to emit a light spot with an identity. The light spot is monitored and tracked, via a light spot tracking unit, to obtain the real-time coordinate data in the binocular coordinate system during the repeating movement. Each real-time coordinate data corresponds to a pose data of the controller. A motion track of the controller in the binocular coordinate system can be obtained by processing the real-time coordinate data and the pose data, while the controller moves in the repeating movement.

At block S104, the motion track of the controller during the repeating movement can be generated based on the real-time coordinate data and the pose data corresponding to the real-time coordinate data.

At block S105, a pose of the controller in a controller coordinate system can be determined based on the motion track, and the pose is defined as a positive direction of the controller in the binocular coordinate system.

The positive direction of the controller in the binocular coordinate system refers to a facing orientation of the controller. In one embodiment, the positive direction of the controller in the binocular coordinate system is determined based on the pose data and the motion track of the controller. The positive direction of the controller in the binocular coordinate system is defined as the positive direction of the controller.

At block S106, an angle between the positive direction of the controller coordinate system and a positive direction of the binocular coordinate system can be determined according to the pose of the controller and the real-time coordinate data of the controller, and the angle can be defined as a first angle.

In some embodiments, a plurality of the first angles can be obtained, when a plurality of controllers are provided. The coordinate system may be confused, if adjusts the binocular coordinate system whenever one first angel is obtained. Therefore, before adjusting the binocular coordinate system, an average value of the plurality of the first angels can be obtained. The average value is regarded as the first angle for adjusting or correcting coordinates in the binocular coordinate system in subsequent blocks.

At block S107, the binocular coordinate system can be corrected based on the first angle until the angle between the positive direction of the controller and the positive direction of the binocular coordinate system reaches zero, and the positive direction of a virtual object corresponding to the controller in a virtual environment is aligned with the positive direction of the virtual environment coordinate system.

In some embodiments, a preset coordinate mapping relationship is set between the virtual environment coordinate system and the binocular coordinate system in a virtual reality device, an augmented reality device or a mixed reality device. When the coordinate of one of the virtual environment coordinate system and the binocular coordinate system is changed, the coordinate of the other coordinate system may also be changed. In this embodiment, the positive direction of the binocular coordinate system is adjusted based on the first angle, when the first angle between the positive direction of the controller and the positive direction of the binocular coordinate system is obtained, so that the positive direction of the binocular coordinate system is aligned with the positive direction of the virtual reality device, augmented reality device or the mixed reality device. At the same time, the virtual environment coordinate system will be changed based on the binocular coordinate system, thus the positive direction of the virtual object corresponding to the controller in the virtual environment is aligned with the positive direction of the virtual environment.

Wherein, the binocular coordinate system has a preset mapping relationship with the virtual environment coordinate system.

According to the disclosed embodiment of the present disclosure, only one light spot is needed to be arranged on the controller when the IMU is aligned with the controller. Thus, an alignment between the positive direction of the controller and the positive direction of the virtual environment coordinate system is realized, which has the advantages of simple process and lower cost.

In order to obtain the first angle with higher precision by calculating, the repeating movement in the embodiment of the present disclosure may refer to a repeating movement of a regular track, for example, the repeating movement of the controller can be in a linear reciprocating movement or a circular looping movement of the controller. The block S103 may be further defined as the following steps.

The real-time coordinate data in the binocular coordinate system of the controller can be acquired based on the light spot emitted from the controller during the linear reciprocating movement or the circular looping movement of the controller.

In addition, in order to further improve the accuracy of the first angle, the present disclosure further discloses a specific process for obtaining the first angle. Referred to FIG. 3, the block S105 and block S106 further includes the following steps.

Figure 3:
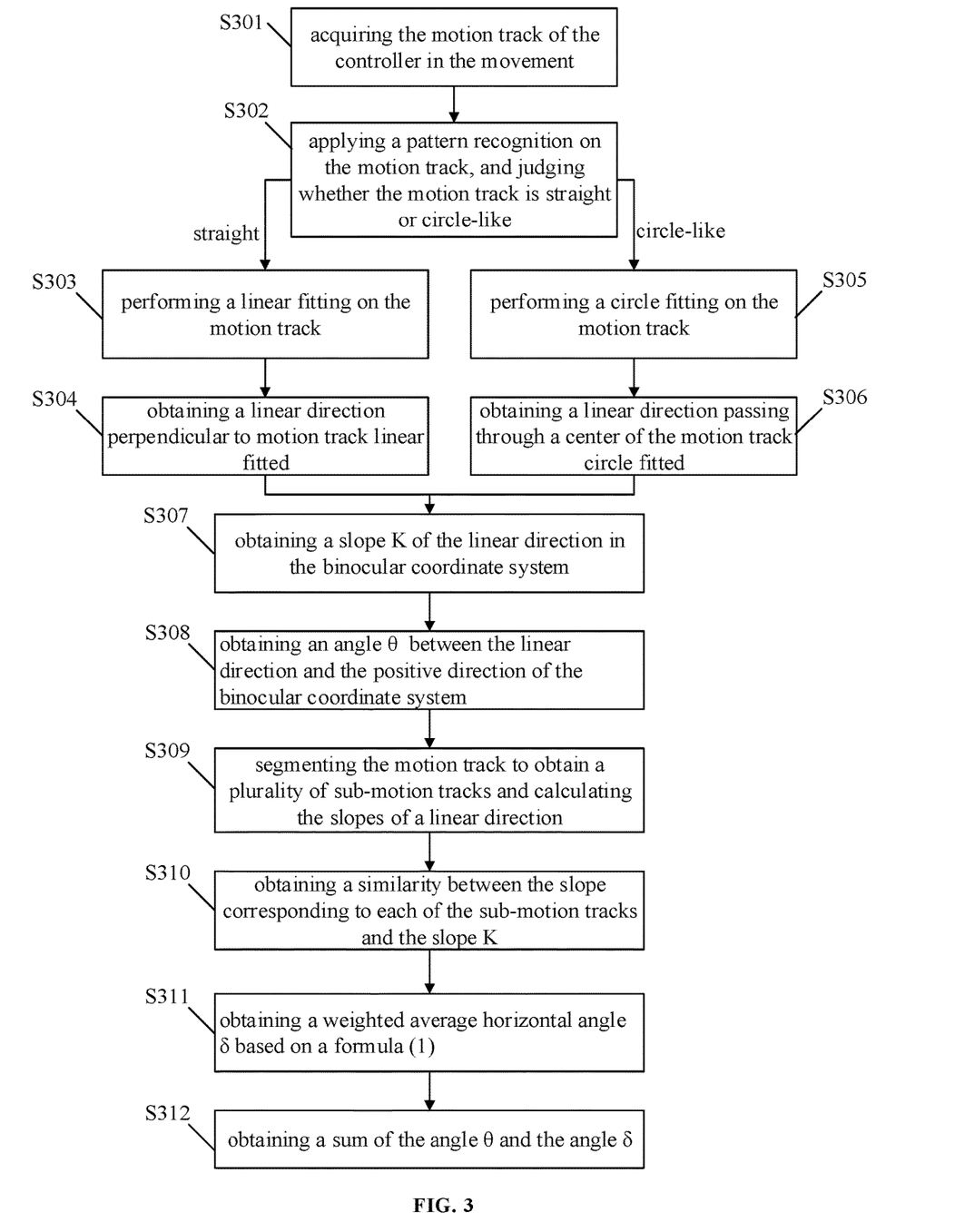
FIG. 3 is a flowchart of an embodiment of calculating an angle between a positive direction of a controller and a positive direction of a binocular coordinate system according to the present disclosure.

At block S301, the motion track of the controller during the movement can be acquired, wherein the motion track includes the real-time coordinate data and the pose data of the controller.

At block S302, the motion track which is straight-line or circle-like can be judged by performing pattern recognition, a block S303 can be executed when the motion track is straight-line, and a block S305 can be executed when the movement track is circle-like.

At the block S303, a linear fitting can be performed on the motion track when the motion track is straight-line, and a block S304 can be executed.

At the block S304, a linear direction perpendicular to the motion track linear fitted can be obtained by calculating.

At the block S305, a circle fitting can be performed on the motion track when the motion track is circle-like, and a block S306 can be executed.

At the block S306, a linear direction passing through the center of the motion track circle fitted can be obtained by calculating.

At block S307, a slope K of the linear direction in the binocular coordinate system can be obtained by calculating.

Wherein the slope K refers to a slope relative to the positive direction of the binocular coordinate system in a plane formed by a vertical direction of the slope K and the positive direction of the binocular coordinate system.

At block S308, an angle θ between the linear direction and the positive direction of the binocular coordinate system can be obtained based on the slope K.

At block S309, the motion track is segmented to obtain a plurality of sub-motion tracks, and the slopes $K_i$ of linear direction corresponding to each of the sub-motion tracks in the binocular coordinate system can be obtained by calculating, wherein the i of $K_i$ corresponds to each of the sub-motion tracks.

In some embodiments, in order to ensure the accuracy of the calculating result, the angle θ is further corrected. The motion track can be segmented by a preset distance. The preset distance may refer to the distance between two sampling spots on the motion track, that is, the motion track between each two sampling spots is defined as the sub-motion track. The sub-motion tracks obtained by segmenting are processed based on the block S302 to the block S308. The slope $K_i$ corresponding to each of the sub-motion tracks is obtained.

At block S310, a similarity $D_i$ between the slope $K_i$ corresponding to each of the sub-motion tracks and the slope K can be obtained by calculating.

At block S311, an weighted average horizontal angle δ can be obtained based on a formula $\delta = \Sigma_{i=1}^{N} K_i * \overline{D}_i$ (1), wherein the angle δ refers to an angle between the natural direction of the controller and a vertical direction of a binocular plane which is also defined as an azimuth angle, and the angle δ may be obtained by the pose data, N is a total number of the plurality of sub-motion tracks.

At block S312, the sum of the angle θ and δ can be the angle between the positive direction of the controller and the positive direction of the binocular coordinate system.

Figure 2:
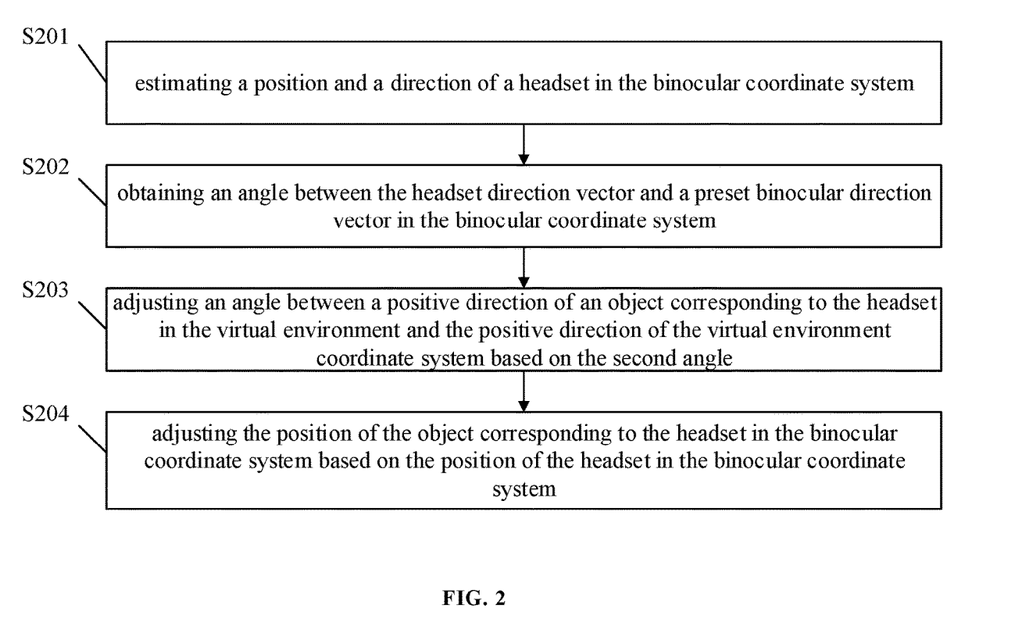
FIG. 2 is a flowchart of another embodiment of a method for aligning coordinate of a headset with a coordinate of the binocular system according to the present disclosure.

In addition to provide a method for aligning the positive direction of the controller with the positive direction of the binocular system (namely the virtual environment coordinate system), the present disclosure further provides a method for aligning a coordinate of a headset and a coordinate of the binocular system. As shown in FIG. 2, the method may include the following steps.

At block S201, the position and orientation of the headset in the binocular coordinate system can be estimated based on two light spots emitted from the headset, and the orientation of the headset in the binocular coordinate system is defined as a headset direction vector.

The headset is provided with two light spot emitting unit. The two light spot emitting unit is used to emit two light spots. The position and direction of the two light spots in the binocular coordinate can be estimated when the two light spots are detected by a light spot tracking unit, wherein the position and direction may be an orientation corresponding to the two light spots, and the orientation of the two light spots of the headset in the binocular coordinate system is defined as the headset direction vector.

At block S202, an angle between the headset direction vector and a preset binocular direction vector in the binocular coordinate system can be obtained by calculating, and the angle is defined as a second angle.

At block S203, an angle between a positive direction of an object corresponding to the headset in the virtual environment and the positive direction of the virtual environment coordinate system can be adjusted based on the second angle.

In some embodiments, the object corresponding to the headset in the virtual environment may be considered as a virtual user. The virtual user may be adjusted, based on the second angle, so as to make the angle between the positive direction of the virtual user and the positive direction of the virtual environment coordinate system equal to the second angle. Thus, the orientation of the headset is aligned in the virtual environment coordinate system.

At block S204, the position of the object of the virtual environment corresponding to the headset in the binocular coordinate system can be adjusted based on the position of the headset in the binocular coordinate system, and the position of the headset in the virtual environment coordinate system can be aligned.

In another embodiment of the present disclosure, the method of estimating the position and orientation of the headset in the binocular coordinate system based on the two light spots emitted from the headset includes the following.

The position of the two light spots in the binocular coordinate system can be obtained by processing the image of the two light spots emitted from the headset, with stereo measurement estimation. The position of the headset in the binocular coordinate system can be obtained by calculating the position of the two light spots in the binocular coordinate system, and the position of the virtual user corresponding to the headset in the virtual environment coordinate system can be obtained. The positive direction of the two light spots in the binocular coordinate system can be obtained by calculating the position of the two light spots in the binocular coordinate system. The positive direction of the two light spots is defined as the positive direction of the headset in the binocular coordinate system. Thus, the positive direction of the virtual user corresponding to the headset in the virtual environment coordinate system is obtained.

Figure 4:
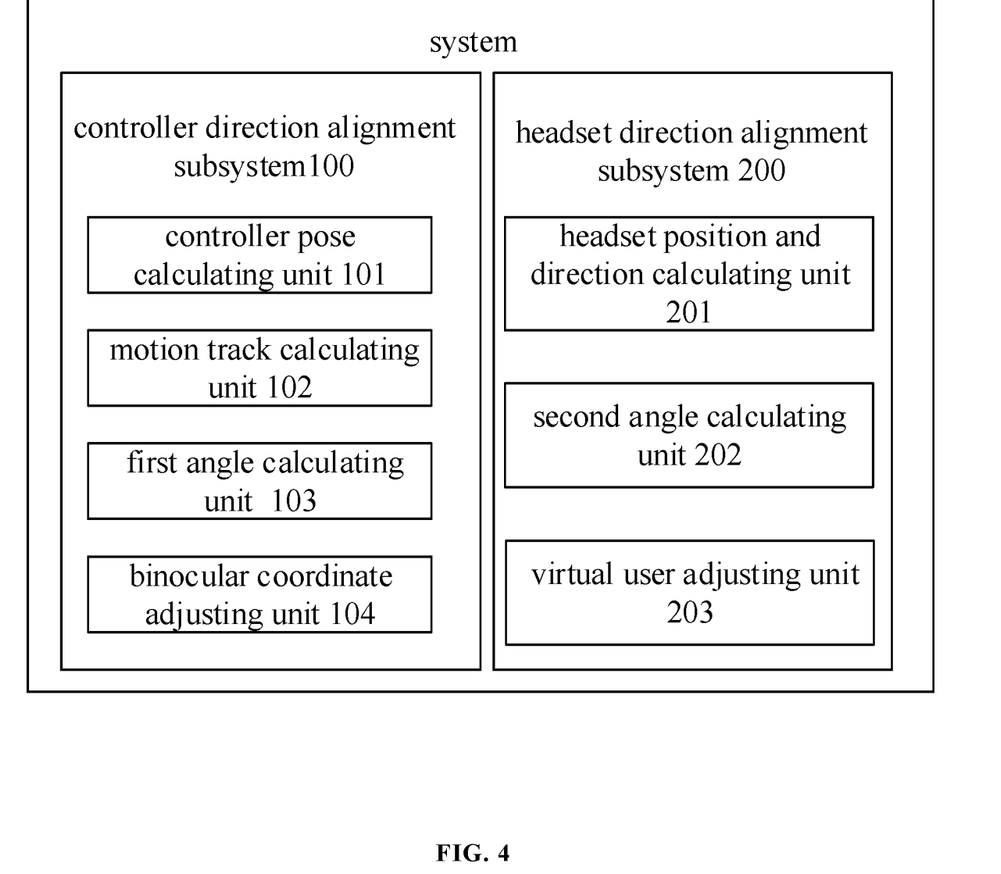
FIG. 4 is a schematic diagram of an embodiment of a device for aligning the coordinate of the controller with the coordinate of the binocular system according to one embodiment of the present disclosure.

The disclosure also provides a device for aligning a coordinate of a controller with a coordinate of a binocular system corresponding to the method mentioned above. As shown in FIG. 4, the device for aligning coordinate of a coordinate of a controller with a coordinate of a binocular system may be applied on a VR device, an AR device, or an MR device. The device includes a controller direction alignment subsystem 100. The controller direction alignment subsystem 100 is used to finally align the virtual object corresponding in the controller in the virtual environment with the virtual environment coordinate system.

The controller direction alignment subsystem 100 may include a controller pose calculating unit 101, a motion track calculating unit 102, a first angle calculating unit 103, and a binocular coordinate adjusting unit 104.

The controller pose calculating unit 101 is corresponding to the blocks S101 and S102 of the method for aligning the coordinate of the controller with the coordinate of the binocular system. The controller pose calculating unit 101 is used for acquiring sensor data of the controller and obtaining pose data according to the sensor data of the controller.

The motion track calculating unit 102 is corresponding to the blocks S103 and S104 of the method for aligning coordinates. The motion track calculating unit 102 is used for acquiring real-time coordinate data of the controller in the binocular coordinate system during a repeating movement based on a light spot emitted from the controller and generating a motion track of the controller in the movement based on the real-time coordinate data and the pose data corresponding to the real-time coordinate data.

The first angle calculating unit 103 is corresponding to the blocks S105 and S106 of the corresponding method for aligning coordinates. The first angle calculating unit 103 is used for determining the pose of the controller in a controller coordinate system based on the motion track, wherein the positive direction of the controller in the binocular coordinate system is defined as the positive direction of the controller, and determining an angle between the positive direction of the controller coordinate system and a positive direction of the binocular coordinate system by calculating, wherein the angle is defined as the first angle.

The binocular coordinate adjusting unit 104 is corresponding to the block S107. The binocular coordinate adjusting unit 104 is used for correcting the binocular coordinate system based on the first angle until an angle between the positive direction of the controller and the positive direction of the binocular coordinate system reaches zero, so that the positive direction of the virtual object corresponding to the controller in a virtual environment is aligned with the positive direction of the binocular coordinate system, wherein a preset coordinate mapping relationship is established between the binocular coordinate system and the virtual environment coordinate system.

Corresponding to the method for aligning coordinates above, the first angle calculating unit 103 may be configured for: acquiring the motion track of the controller during the movement; when the motion track is a straight line, the motion track is subjected to a linear fitting; a straightness of the motion track is obtained by calculation, and a linear direction perpendicular to the motion track which is linear fitted can be obtained by calculating; when the motion track is circle-like, the motion track is subjected to a circle fitting; a curvature of the motion track is obtained by calculation, and a linear direction passing through a center of the motion track is obtained by calculation; obtaining a slope K of the linear direction in the binocular coordinate system; obtaining an angle θ between the linear direction and the positive direction of the binocular coordinate system based on the slope K; segmenting the motion track to obtain a plurality of sub-motion tracks and obtaining the slopes $K_i$ of linear direction corresponding to each of the sub-motion tracks in the binocular coordinate system by calculating, wherein the i corresponds to each of the sub-motion tracks; obtaining a similarity $D_i$ between the slope $K_i$ corresponding to each of the sub-motion tracks and the slope K; obtaining a weighted average horizontal angle δ based on a formula $\delta=\Sigma_{i=1}^{N}K_i*\overline{D}_i$, wherein N is a total number of the plurality of sub-motion tracks; obtaining a sum of the angle θ and the angle δ, wherein the sum of the angle θ and the angle δ can be the angle between the positive direction of the controller and the positive direction of the binocular coordinate system.

Corresponding to the method for aligning the coordinate of the headset with the coordinate of the binocular system, the device for aligning the coordinate of the controller with the coordinate of the binocular system further includes a subsystem for aligning the coordinate of the headset with the coordinate of the binocular system.

The headset direction alignment subsystem 200 includes a headset position and direction calculating unit 201, a second angle calculating unit 202, and a virtual user adjusting unit 203.

The headset position and direction calculating unit 201 is corresponding to the block S201 of the method. The headset is used for estimating a position and an orientation of the headset in the binocular coordinate system based on the two light spots emitted from the headset and defining the direction of the headset in the binocular coordinate system as a headset direction vector.

The second angle calculating unit 202 is corresponding to the block S202 of the method. The second angle calculating unit 202 is used for calculating an angle between the headset direction vector and a predetermined binocular direction vector in the binocular coordinate system and defining the angel as a second angle.

The virtual user adjusting unit 203 is corresponding to the blocks S203 and S204 of the method for aligning coordinates. The virtual user adjusting unit 203 is used for adjusting an angle between a positive direction of the object corresponding to the headset in the virtual environment and the positive direction of the virtual environment coordinate system based on the second angle, and also used for adjusting a position of the object of the virtual environment corresponding to the headset in the binocular coordinate system based on the position of the headset in the binocular coordinate system.

Corresponding to the method for aligning the coordinate of the controller with the coordinate of the binocular system, the motion track calculating unit 102 is used for acquiring real-time coordinate data in the binocular coordinate system of the controller in a reciprocating movement or a circular looping movement based on the light spots emitted from the controller and generating the motion track of the controller in a movement based on the real-time coordinate data.

Corresponding to the method, the headset position and direction calculating unit 201 is configured for: processing the image of the two light spots emitted from the headset to obtain the position of the two light spots in the binocular coordinate system by stereo measurement estimating, calculating the position of the headset in the binocular coordinate system based on the position of the two light spots in the binocular coordinate system, calculating a positive direction of the two light spots in the binocular coordinate system based on the position of the two light spots in the binocular coordinate system.

Corresponding to the system for aligning coordinates, the disclosure further provides a virtual reality system, an augmented reality system, or a mixed reality system. The system may include a head mounted display, a controller, a two light spot emitting unit, a light spot emitting unit and a light spot tracking unit. All the units in the system for aligning coordinates disclosed by the embodiment are arranged in corresponding device respectively.

The two light spot emitting unit is coupled to the head mounted display. The two light spot emitting unit is used for emitting two light spots with a unique ID identity respectively.

The controller is communicated with the head mounted display in a wireless manner or in a wired manner.

The light spot emitting unit coupled to the controller and is used for emitting one light spot with a unique ID identity.

The light spot tracking unit is used for capturing the light spots. The light spot tracking unit includes the motion track calculating unit and the headset position and direction calculating unit. The light spot tracking unit is used to obtain a motion track and a headset direction vector sent to the headset via the two light spot emitting unit.

The headset includes the controller pose calculating unit, the first angle calculating unit, the binocular coordinate adjusting unit, the second angle calculating unit and the virtual user adjusting unit.

In use, the two light spot emitting unit is installed on the headset. When the two light spot emitting unit is a non-integrated headset, a mobile phone is inserted into the headset, and the headset is arranged in front of a binocular camera (also viewed as a binocular tracking unit). The headset is worn on the head. The binocular tracking unit can see two light spots emitted by the two light spot emitting unit. Each of the two light spots is provided with an ID, so that a light spot P1 can be distinguished from a light spot P2. The binocular tracking unit estimates a three-dimensional measurement of image processing on the light spots to obtain the position P1 (x, y, z) and P2 (x, y, z) of the two light spots in the binocular coordinate system. The position of the two light spots is transmitted to the two light spot emitting unit by a wireless or wired mode, and then and the position of the two light spots is sent to a processor of the headset for algorithm calculating. After the headset obtains the position of the two light spots, the positive direction of the two light spot is estimated, and the positive direction of the two light spots is the positive direction of the head mounted display. The display center is placed in the positive direction of the binocular camera so as to locate the direction of the two light spots in the binocular coordinate system and form a direction vector (headset direction vector). The direction vector is used for obtaining the angle between the headset direction vector and the direction vector of the positive direction of the binocular coordinate system by calculating. That is, the position and the direction of the virtual user corresponding to the headset in the virtual environment can be directly obtained through an angle correction.

The process of aligning the controller is shown in the following embodiment.

The headset is connected to two handles through the Bluetooth. Each handle represents a controller. The handle is used for obtaining data and fusing data from the sensor through an internal calculating unit MCU (Microprogrammed Control Unit), so as to obtain a handle pose data O1 (yaw, pitch, roll) and O2 (yaw, pitch, roll). The handle pose data is transmitted to the headset through the Bluetooth or a data line. The light spots of the handle are identified and positioned by the light spot tracking unit to obtain coordinates of the handle in a binocular coordinate system, that is, P3 (X, Y, Z) and P4 (X, Y, Z). Then, a user takes up the handle and performs transversely or rotationally repeating motion in front of the binocular tracking unit. The binocular tracking unit obtains the light spots of the left handle and the right handle based on an image color by an image processing and stereoscopic vision. The 3D position of the light spots emitted from the handle in the binocular coordinate system is obtained through three-dimensional vision. The 3D position information of the light spots each representing a corresponding handle in the binocular coordinate system is sent to the headset through the light spot emitting unit via wireless manner or data lines. The handles and the headset are synchronized through time stamps to obtain 6DOF data on the unified time axis. After the headset receives the position and the pose data of the handle, the angle between the positive direction of the handle and the positive direction of the binocular coordinate system is estimated based on the motion track of the handle, such as left and right linear motion or rotating circular motion. The positive direction of the binocular coordinate system is adjusted based on the angle. The positive direction of the handle is aligned with the positive direction of the binocular coordinate system, namely, in the virtual environment, the positive direction of the hand or the hand-held object is aligned with the positive direction of the virtual environment. A calculating unit is arranged inside the headset, and the built-in algorithm is used for detecting the motion track of the light spot of the handle. The direction of the motion track of the handle can be estimated by restraining the movement through the IMU data. The azimuth angle of the handle (the angle between the positive direction of the handle and the positive direction of the binocular coordinate system) is obtained. The positive direction of the handle is aligned with the positive direction of the binocular coordinate system through the azimuth angle, and the positive direction of the binocular coordinate system is also the direction of the person in the virtual environment.

For convenience of description, the functions of the system are described as various modules respectively. Of course, the functions of the modules can be implemented in one or more software and/or hardware when implementing the present invention.

Various embodiments in the specification are described in a progressive manner, and the parts with the same similarity among the embodiments can be seen from each other. The emphasis instead is placed upon clearly illustrating the differences between the present disclosure. For systems or system embodiments, it is basically like the method embodiments, so that the description is simple and relevant to the description of the method embodiment. The system and system embodiments described above are merely schematic, wherein the units described as separate parts may or may not be physically separated. The component displayed as a unit can be or may not be a physical unit or can be distributed to a plurality of network units. The objective of the embodiment can be realized by selecting some or all the modules according to actual requirements. Persons of ordinary skilled in the art can understand and implement the method without creative efforts.

The professional personnel can further realize the steps of the units and algorithm steps described by the embodiments of the present disclosure can be implemented in an electronic hardware, computer software or a combination of the two. In order to clearly illustrate the interchangeability of hardware and software, in the above description, the composition and the steps of the examples have been described generally in terms of functions. Whether the functions are executed by hardware or software depends on the specific application and design constraints of the technical scheme. A person skilled in the art can use different methods to implement the described functions for each application, but such implementation should not be beyond the scope of the present disclosure.

The steps of the method or algorithm described in connection with the embodiments disclosed herein may be embodied directly in hardware, a software module executed by a processor, or a combination of the software modules and the software modules executed by the processor. The software module may be placed in a random-access memory (RAM), a memory, a read-only memory (ROM), an electrically programmable ROM, an electrically erasable programmable ROM and a register, a hard disk, a removable magnetic disk, a CD-ROM, or any other form of storage medium known in the technical field.

It should also be noted that, in the present disclosure, such as first and second, are only used to distinguish one entity or operation from another entity or operation, and any actual relationship or sequence exists between the entities or the operations does not need to be required or implied. Moreover, the terms "comprising", "include" or any other variants thereof are intended to encompass a non-exclusive inclusion, so that the process and the method which comprise a series of elements are achieved. The article or the device not only includes those elements but also includes other elements not explicitly listed, or further comprises the inherent elements of the process, the method, the article or the equipment. In the case that there are no more restrictions, the statement "comprising one" is not excluded from the process comprising the element, the method, the article or the equipment further have the same elements in the article or the equipment.

The above description of the disclosed embodiments can enable any person skilled in the art to realize or use the present disclosure. Various modifications to these embodiments will be apparent to those skilled in the art, the general principles defined herein may be practiced without departing from the spirit or scope of the present disclosure in other embodiments. Accordingly, the disclosure will not be limited to the embodiments shown herein but is to be accorded the widest scope consistent with the principles and novel features disclosed herein.

What is claimed is:

1. A method for aligning a coordinate of a controller with a coordinate of a binocular system, comprising:

obtaining pose data of the controller;

acquiring real-time coordinate data of the controller in a binocular coordinate system during a repeating movement based on a light spot emitted from the controller;

generating a motion track of the controller during the repeating movement based on the real-time coordinate data and the pose data corresponding to the real-time coordinate data;

determining a pose of the controller in a controller coordinate system based on the motion track, and the pose being defined as a positive direction of the controller in the binocular coordinate system;

determining an angle between the positive direction of the controller coordinate system and a positive direction of the binocular coordinate system, the angle being defined as a first angle, comprising:

acquiring the motion track of the controller in the movement;

when the motion track is circle-like, the motion track is subjected to a circle fitting, and a linear direction passing through a center of the motion track circle fitted is obtained by calculation;

obtaining a slope K of the linear direction in the binocular coordinate system by calculation;

obtaining an angle θ between the linear direction and the positive direction of the binocular coordinate system based on the slope K by calculation;

segmenting the motion track to obtain a plurality of sub-motion tracks and obtaining the slopes $K_i$ of a linear direction corresponding to each of the sub-motion tracks in the binocular coordinate system, wherein i corresponds to each of the sub-motion tracks;

obtaining a similarity $D_i$ between the slope $K_i$ corresponding to each of the sub-motion tracks and the slope K by calculation;

obtaining a weighted average horizontal angle δ based on a formula $\delta=\Sigma_{i=1}^{N}K_i*\overline{D}_i$ wherein N is a total number of the plurality of sub-motion tracks; and obtaining a sum of the angle θ and the angle δ to be an angle between the positive direction of the controller and the positive direction of the binocular coordinate system; and correcting the binocular coordinate system based on the first angle until the angle between the positive direction of the controller and the positive direction of the binocular coordinate system reaches zero.

2. The method of claim 1, further comprising:
acquiring sensor data of the controller; and
obtaining the pose data of the controller according to the sensor data.

3. The method of claim 1, wherein correcting the binocular coordinate system further comprises:
aligning a positive of a virtual object corresponding to the controller in a virtual environment with a positive direction of a coordinate of the virtual environment, wherein a preset coordinate mapping relationship is established between the binocular coordinate system and the virtual environment coordinate system.

4. The method of claim 1, further comprising:
estimating a position and orientation of a headset in the binocular coordinate system based on two light spots emitted from the headset, wherein the orientation of the headset in the binocular coordinate system is defined as a headset direction vector;

obtaining an angle between the headset direction vector and a preset binocular direction vector in the binocular coordinate system, the angle is defined as a second angle;

adjusting an angle between a positive direction of an object corresponding to the headset in the virtual environment and the positive direction of the virtual environment coordinate system of the virtual environment based on the second angle; and adjusting the position of the object corresponding to the headset in the virtual environment in the binocular coordinate system based on the position of the headset in the binocular coordinate system.

5. The method of claim 4, wherein estimating the position and the direction of the headset comprises:

obtaining the position of the two light spots in the binocular coordinate system by processing an image of the two light spots emitted from the headset with stereo measurement estimation;

obtaining the position of the headset in the binocular coordinate system based on the position of the two light spots in the binocular coordinate system;

obtaining a positive direction of the two light spots in the binocular coordinate system based on the position of the two light spots in the binocular coordinate system; and defining the positive direction of the two light spots as the positive direction of the headset.

6. The method of claim 1, wherein acquiring the real-time coordinate data in the binocular coordinate system in the repeating movement of a regular track of the controller is based on the light spot emitted from the controller.

7. The method of claim 6, wherein acquiring the real-time coordinate data in the binocular coordinate system in the repeating movement of a regular track of the controller comprises:

acquiring the real-time coordinate data in the binocular coordinate system either in a linear reciprocating movement of the controller or a circular looping movement of the controller based on the light spot emitted from the controller.

8. A method for aligning a coordinate of a controller with a coordinate of a binocular system, comprising:

obtaining pose data of the controller;

acquiring real-time coordinate data of the controller in a binocular coordinate system during a repeating movement based on a light spot emitted from the controller;

generating a motion track of the controller during the repeating movement based on the real-time coordinate data and the pose data corresponding to the real-time coordinate data;

determining a pose of the controller in a controller coordinate system based on the motion track, and the pose being defined as a positive direction of the controller in the binocular coordinate system;

determining an angle between the positive direction of the controller coordinate system and a positive direction of the binocular coordinate system, the angle being defined as a first angle, comprising:

acquiring the motion track of the controller in the movement;

wherein when the motion track is a straight line, the motion track is subjected to a linear fitting, and a linear direction perpendicular to the motion track linear fitted is obtained by calculating;

obtaining a slope K of the linear direction in the binocular coordinate system by calculation;

obtaining an angle θ between the linear direction and the positive direction of the binocular coordinate system based on the slope K by calculation;

segmenting the motion track to obtain a plurality of sub-motion tracks and obtaining the slopes $K_1$ of a linear direction corresponding to each of the sub-motion tracks in the binocular coordinate system, wherein i corresponds to each of the sub-motion tracks;

obtaining a similarity $D_i$ between the slope $K_i$ corresponding to each of the sub-motion tracks and the slope K by calculation;

obtaining a weighted average horizontal angle δ based on a formula $\delta=\Sigma_{i=1}^{N} K_i * \overline{D}_i$ wherein N is a total number of the plurality of sub-motion tracks; and obtaining a sum of the angle θ and the angle δ to be an angle between the positive direction of the controller and the positive direction of the binocular coordinate system; and correcting the binocular coordinate system based on the first angle until the angle between the positive direction of the controller and the positive direction of the binocular coordinate system reaches zero.

9. The method of claim 8, wherein a straightness of the motion track is obtained when the motion track is a straight line.

10. The method of claim 1, wherein a curvature of the motion track is obtained when the motion track is circle-like.

11. A device for aligning a coordinate of a controller with a coordinate of a binocular system, comprising:

one or more processors; and a memory storing one or more programs configured to be executed by the one or more processors, the one or more programs comprising instructions for:

obtaining pose data of the controller;

acquiring real-time coordinate data of the controller in a binocular coordinate system during a repeating movement based on a light spot emitted from the controller;

generating a motion track of the controller during the repeating movement based on the real-time coordinate data and the pose data corresponding to the real-time coordinate data;

determining a pose of the controller in a controller coordinate system based on the motion track, and the pose being defined as a positive direction of the controller in the binocular coordinate system;

determining an angle between the positive direction of the controller coordinate system and a positive direction of the binocular coordinate system, the angle being defined as a first angle, comprising:

acquiring the motion track of the controller in the movement;

when the motion track is circle-like, the motion track is subjected to a circle fitting, and a linear direction passing through a center of the motion track circle fitted is obtained by calculation;

obtaining a slope K of the linear direction in the binocular coordinate system by calculation;

obtaining an angle θ between the linear direction and the positive direction of the binocular coordinate system based on the slope K by calculation;

segmenting the motion track to obtain a plurality of sub-motion tracks and obtaining the slopes $K_i$ of a linear direction corresponding to each of the sub-motion tracks in the binocular coordinate system, wherein i corresponds to each of the sub-motion tracks;

obtaining a similarity $D_i$ between the slope $K_i$ corresponding to each of the sub-motion tracks and the slope K by calculation;

obtaining a weighted average horizontal angle $\delta$ based on a formula $\delta=\Sigma_{i=1}^{N}K_i*\overline{D}_i$, wherein N is a total number of the plurality of sub-motion tracks; and obtaining a sum of the angle $\theta$ and the angle $\delta$ to be an angle between the positive direction of the controller and the positive direction of the binocular coordinate system; and correcting the binocular coordinate system based on the first angle until the angle between the positive direction of the controller and the positive direction of the binocular coordinate system reaches zero.

12. The device of claim 11, wherein the one or more programs further comprising instructions for:

acquiring sensor data of the controller; and obtaining the pose data of the controller according to the sensor data.

13. The device of claim 11, wherein correcting the binocular coordinate system comprises aligning a positive of a virtual object corresponding to the controller in a virtual environment with a positive direction of a coordinate of the virtual environment, wherein a preset coordinate mapping relationship is established between the binocular coordinate system and the virtual environment coordinate system.

14. The device of claim 11, wherein the one or more programs further comprising instructions for:

estimating a position and orientation of a headset in the binocular coordinate system based on two light spots emitted from the headset, wherein the orientation of the headset in the binocular coordinate system is defined as a headset direction vector;

obtaining an angle between the headset direction vector and a preset binocular direction vector in the binocular coordinate system, the angle is defined as a second angle;

adjusting an angle between a positive direction of an object corresponding to the headset in the virtual environment and the positive direction of the virtual environment coordinate system of the virtual environment based on the second angle; and adjusting the position of the object corresponding to the headset in the virtual environment in the binocular coordinate system based on the position of the headset in the binocular coordinate system.

15. The device of claim 14, wherein estimating the position and the direction of the headset in the binocular coordinate system comprises:

obtaining the position of the two light spots in the binocular coordinate system by processing an image of the two light spots emitted from the headset with stereo measurement estimation;

obtaining the position of the headset in the binocular coordinate system based on the position of the two light spots in the binocular coordinate system;

obtaining a positive direction of the two light spots in the binocular coordinate system based on the position of the two light spots in the binocular coordinate system; and defining the positive direction of the two light spots as the positive direction of the headset.

16. The device of claim 11, wherein determining the angle between the controller coordinate system and the binocular coordinate system comprises:

acquiring the motion track of the controller in the movement;

wherein when the motion track is a straight line, the motion track is subjected to a linear fitting, and a linear direction perpendicular to the motion track linear fitted is obtained by calculating;

obtaining a slope K of the linear direction in the binocular coordinate system by calculation;

obtaining an angle $\theta$ between the linear direction and the positive direction of the binocular coordinate system based on the slope K by calculation;

segmenting the motion track to obtain a plurality of sub-motion tracks and obtaining the slopes $K_i$ of a linear direction corresponding to each of the sub-motion tracks in the binocular coordinate system, wherein i corresponds to each of the sub-motion tracks;

obtaining a similarity $D_i$ between the slope $K_i$ corresponding to each of the sub-motion tracks and the slope K by calculation;

obtaining a weighted average horizontal angle $\delta$ based on a formula $\delta=\Sigma_{i=1}^{N}K_i*\overline{D}_i$ wherein N is a total number of the plurality of sub-motion tracks; and obtaining a sum of the angle $\theta$ and the angle $\delta$ to be an angle between the positive direction of the controller and the positive direction of the binocular coordinate system.

17. The device of claim 11, wherein acquiring the real-time coordinate data in the binocular coordinate system is in the repeating movement of a regular track of the controller, based on the light spot emitted from the controller.

18. The device of claim 17, wherein acquiring the real-time coordinate data in the binocular coordinate system in the repeating movement of a regular track of the controller comprises: acquiring the real-time coordinate data in the binocular coordinate system either in a linear reciprocating movement of the controller or a circular looping movement of the controller based on the light spot emitted from the controller.

19. The device of claim 14, wherein the controller is communicated with the headset in a wireless manner or in a wired manner.

20. The method of claim 1, wherein acquiring the real-time coordinate data in the binocular coordinate system is in the repeating movement of a regular track of the controller, based on the light spot emitted from the controller.

* * * * *